United States Patent [19]
Logue

[11] Patent Number: 5,574,367
[45] Date of Patent: Nov. 12, 1996

[54] POLAR COORDINATES SENSOR ARRAY WITH ROTATING MAGNETIC FIELD DRIVEN PICKUP ELEMENTS

[76] Inventor: Delmar L. Logue, R.R. #1, Box 60, Herrick, Ill. 62431

[21] Appl. No.: 187,072

[22] Filed: Jan. 27, 1994

Related U.S. Application Data

[63] Continuation-in-part of Ser. No. 842,244, Feb. 27, 1992, Pat. No. 5,404,101, and a continuation-in-part of Ser. No. 108,880, Aug. 13, 1993, abandoned, and a continuation-in-part of Ser. No. 142,933, Oct. 29, 1993, Pat. No. 5,532,591, and a continuation-in-part of Ser. No. 170,058, Dec. 20, 1993.

[51] Int. Cl.$^6$ .............................. G01B 7/14; G01B 7/30
[52] U.S. Cl. .............................. 324/207.26; 324/207.17; 324/228; 324/243
[58] Field of Search .................................... 324/219–221, 324/228, 232, 233, 239–243, 207.17, 207.24–207.26

[56] References Cited

U.S. PATENT DOCUMENTS

| | | | |
|---|---|---|---|
| 2,467,306 | 4/1949 | Habig | 324/242 |
| 2,555,853 | 6/1951 | Irwin | 324/242 |
| 3,392,829 | 7/1968 | Keinanen | 324/243 X |
| 3,617,874 | 11/1971 | Forster | 324/232 X |
| 4,495,466 | 1/1985 | Lakin | 324/242 |
| 4,808,927 | 2/1989 | Cecco et al. | 324/242 X |

*Primary Examiner*—Gerard R. Strecker

[57] ABSTRACT

A polar coordinates sensing array, having a plurality of pick-up poles arranged in a flux balanced hexagonal configuration within a cylindrical outer pole, array driven by a rotating magnetic field within a hollow toroid core excited by sine-cosine excitation, each pole being wound with a pick-up coil for generating a plurality of polar coordinates signals representive of workpiece geometry.

4 Claims, 5 Drawing Sheets

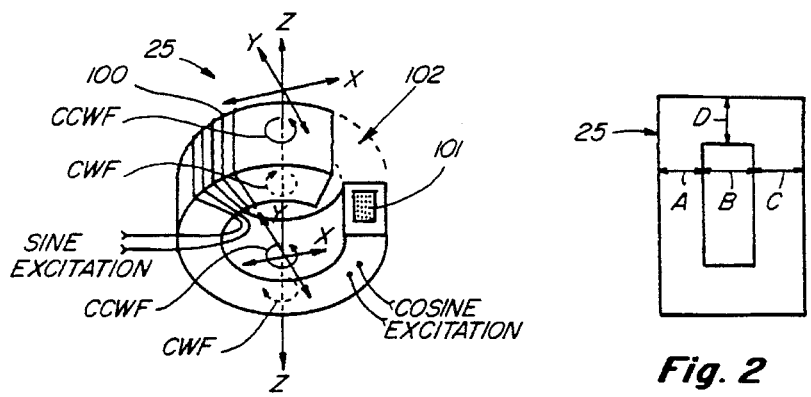
Fig. 1
Fig. 2
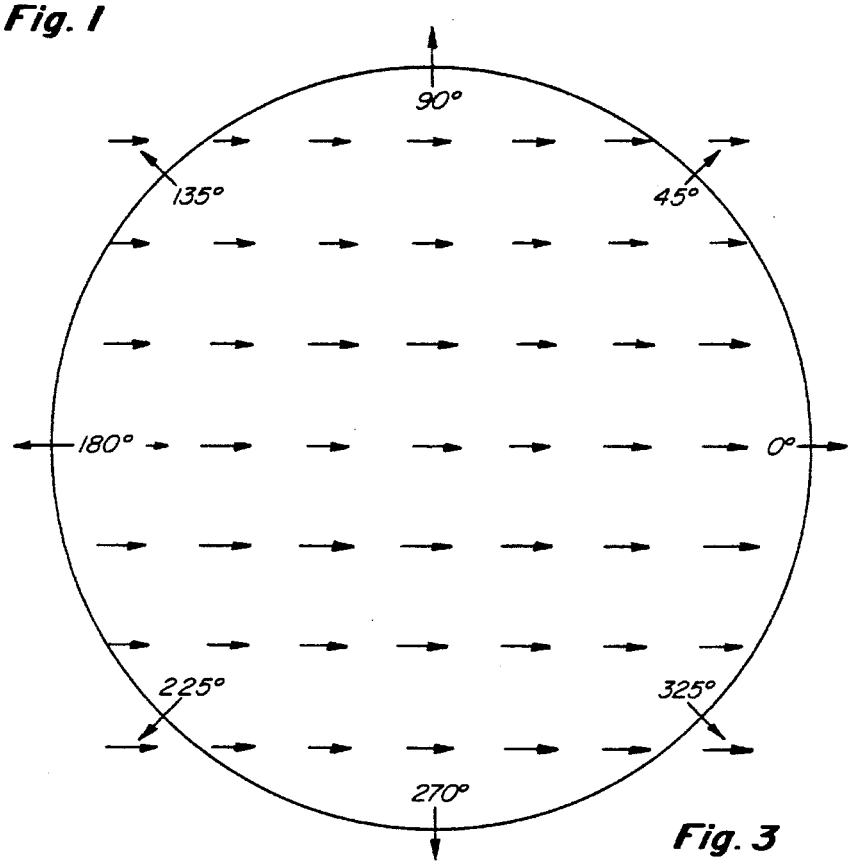
Fig. 3
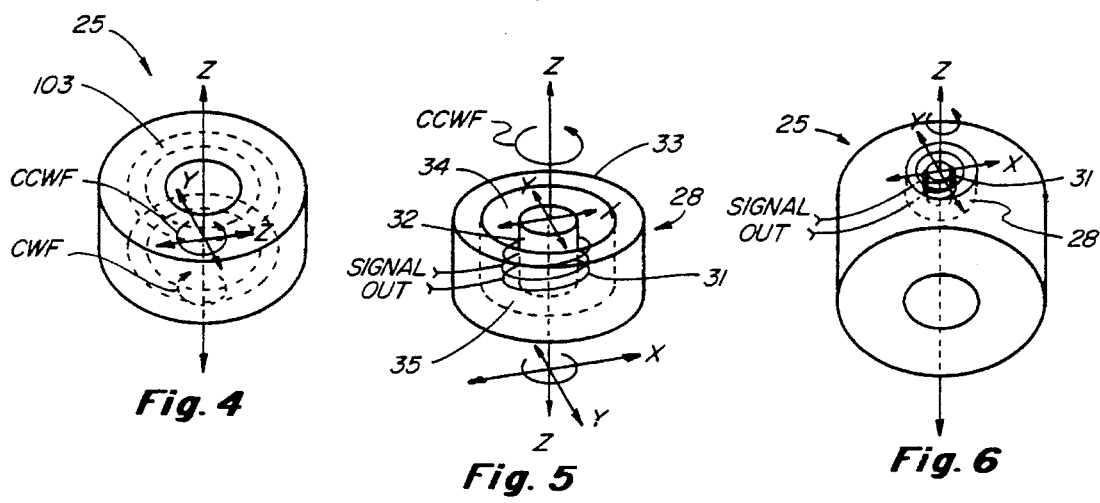
Fig. 4
Fig. 5
Fig. 6

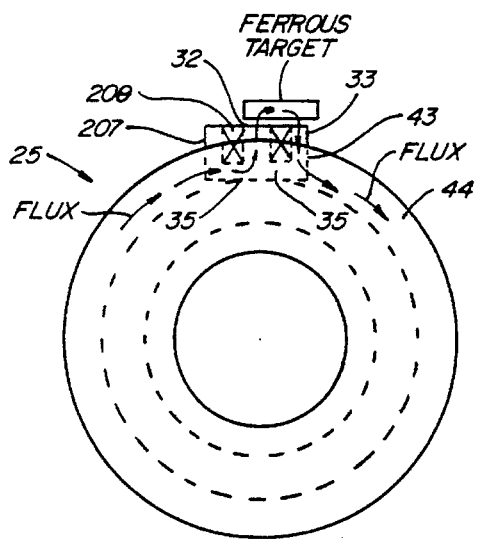
Fig. 7
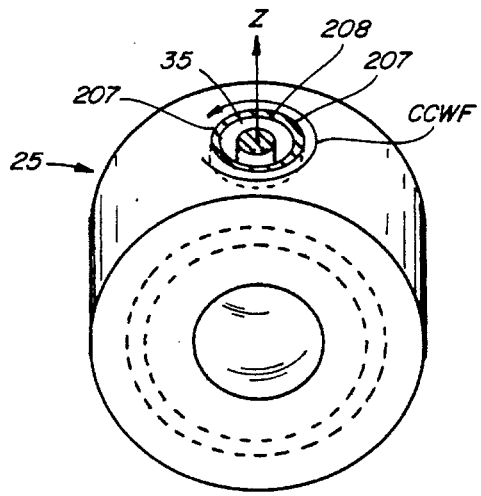
Fig. 8
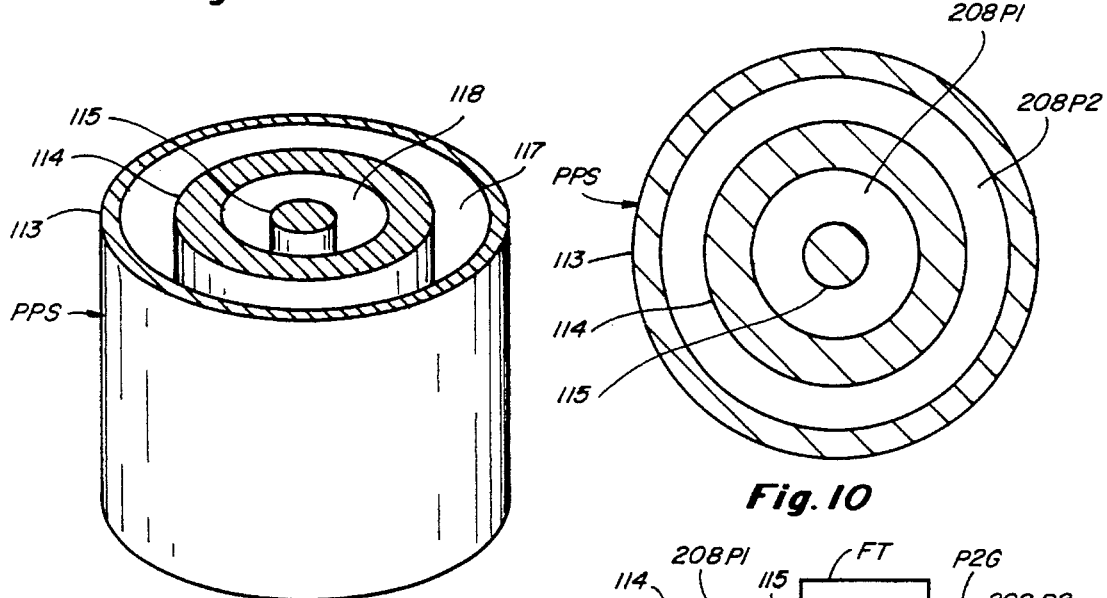
Fig. 9
Fig. 10
Fig. 11
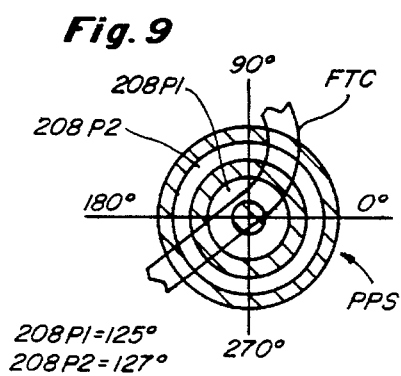
208P1=125°
208P2=127°
Fig. 12

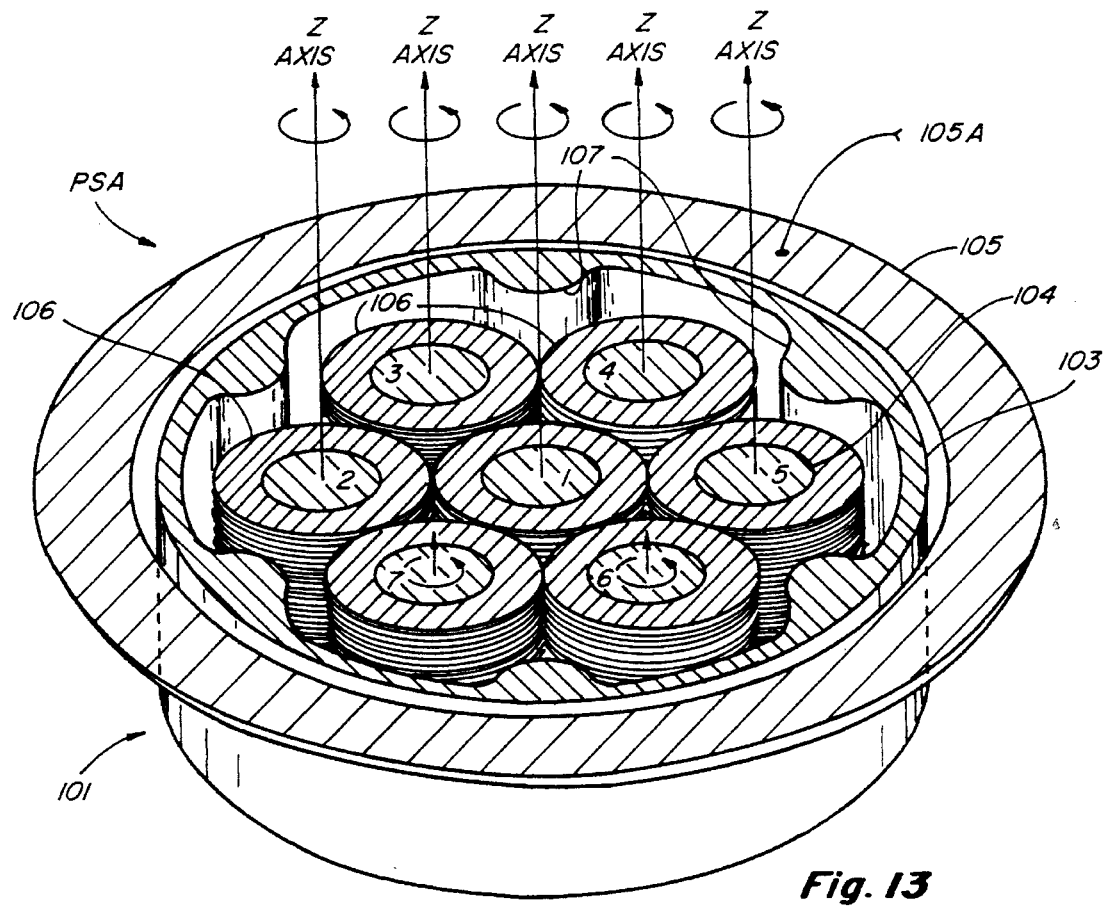
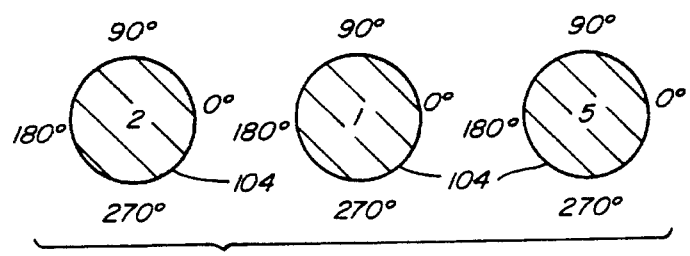
Fig. 14 A
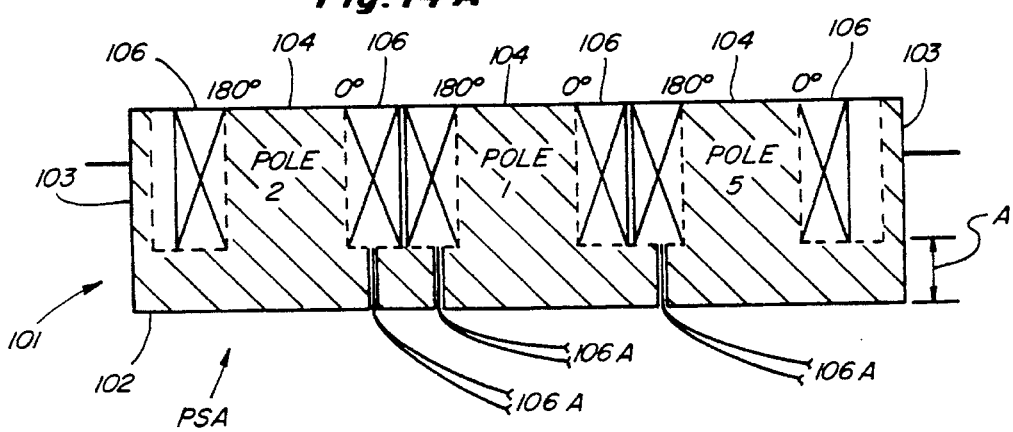
Fig. 14

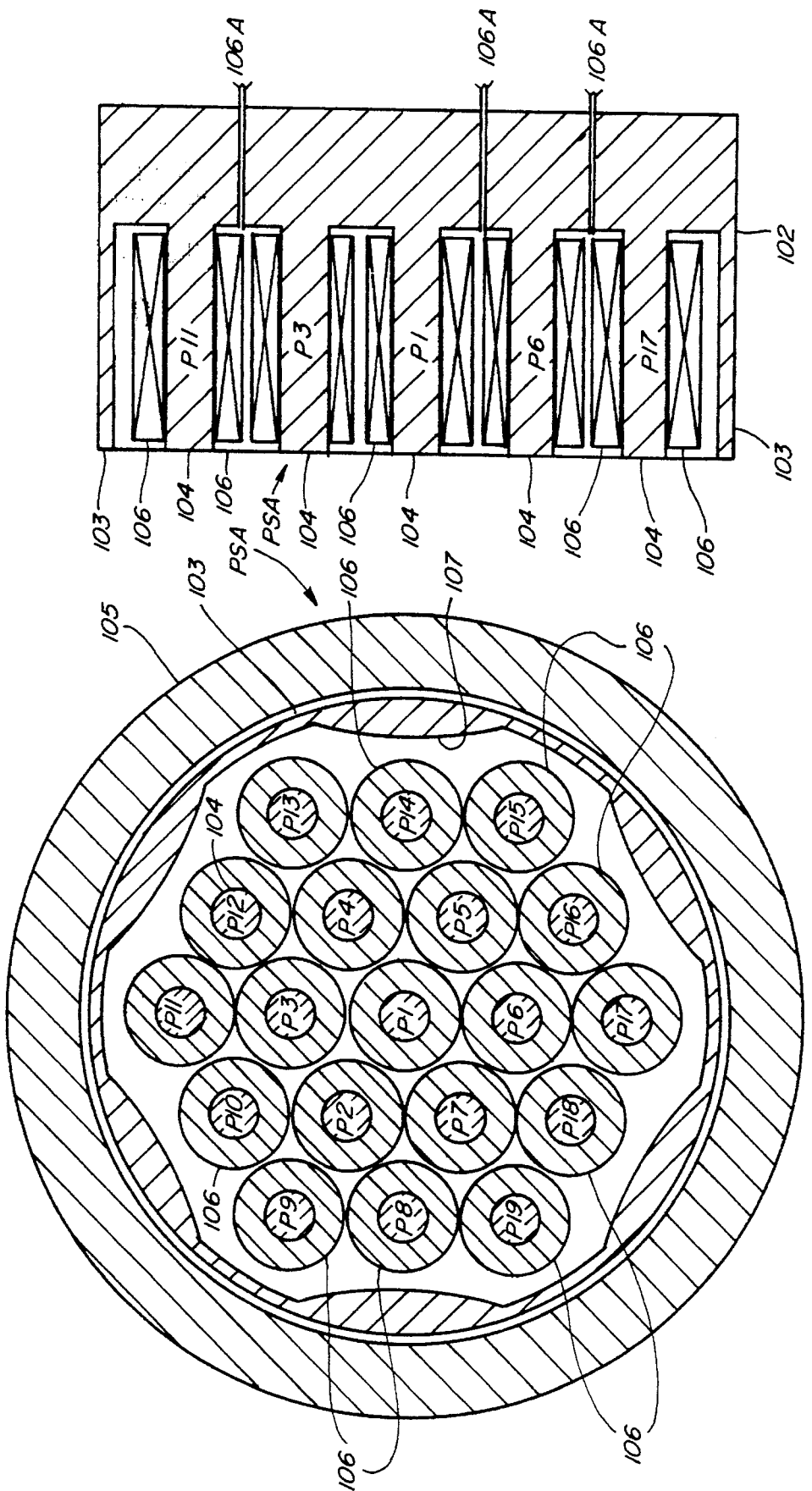

POLAR COORDINATES SENSOR ARRAY WITH ROTATING MAGNETIC FIELD DRIVEN PICKUP ELEMENTS

CROSS-REFERENCE TO RELATED PATENT APPLICATIONS

This application is a continuation in part of patent application Ser. No. 07/842,244 entitled "Rotary Sensing Device" filed on Feb. 27, 1992 now U.S. Pat. No. 5,404,101, and a continuation in part of patent application Ser. No. 08/108,880 entitled "Rotating Magnetic Field Devices" filed on Aug. 18, 1993, now abandoned, and a continuation in part of patent application Ser. No. 08/142,933, entitled "Apparatus for detecting surface flaws in cylindrical articles by means of asymmetric magnetic detection", now U.S. Pat. No. 5,532,591 and a continuation in part of patent application No. 08/170,058 entitled "Cable Tester Utilizing Dual Multiple Polar Sensor Assemblies" filed Dec. 20, 1993, all by the same applicant.

SUMMARY OF THE INVENTION

A first object of the present invention is to provide a high resolution eddy current image of workpiece geometry by means of a plurality of polar coordinates signals generated by a unique pick-up array driven by rotating magnetic field induced within a hollow toroid core.

A second object of the present invention is to provide a high resolution imaging pick-up element that will interchange with the polar sensing pick-up elements utilized in the cited patent applications e.g. single phase, poly-phase polar sensors.

A third object of the present invention is to provide a plurality of polar coordinates pick-up poles disposed in a compact hexagonal structure having mutual balanced rotating flux coupling.

BRIEF DESCRIPTION OF DRAWING FIGS.

FIG. 1 is a perspective view of a hollow toroid core which is the orthogonal structure in which a rotating magnetic field is set up.

FIG. 2 is a cross-sectional view of the hollow toroid core.

FIG. 3 is a demonstration sheet to illustrate the operation of the rotating magnetic field of the invention.

FIG. 4 is a side view of a hollow toroid.

FIG. 5 is a perspective view of the pick-up core and pick-up coil comprising a polar sensor element.

FIGS. 6–8 are perspective views of the 360 degree flux coupling around the pick-up core element.

FIGS. 9–12 illustrate a poly-phase polar sensor element.

FIG. 13 is a perspective view of a polar sensing array having 7 cylindrical pick-up poles arranged in a hexagonal pattern inside an outer cylindrical pole.

FIG. 14 is a diameter-wise cross-sectional view of the polar sensing array of FIG. 13 showing pick-up poles 2, 1, 5, each being wound with a pick-up coil.

FIG. 14A is a top radial view of cylindrical pick-up poles 2, 1, 5, of FIG. 14 illustrating the rotating field azimuth reference points of each.

FIG. 16 is a plane view of a 19 pole hexagonal sensing array.

FIG. 16A is a cross-section view of the 19 pole sensing array of FIG. 16.

ROTATING MAGNETIC FIELD SENSOR FUNDAMENTALS

Figure 15:
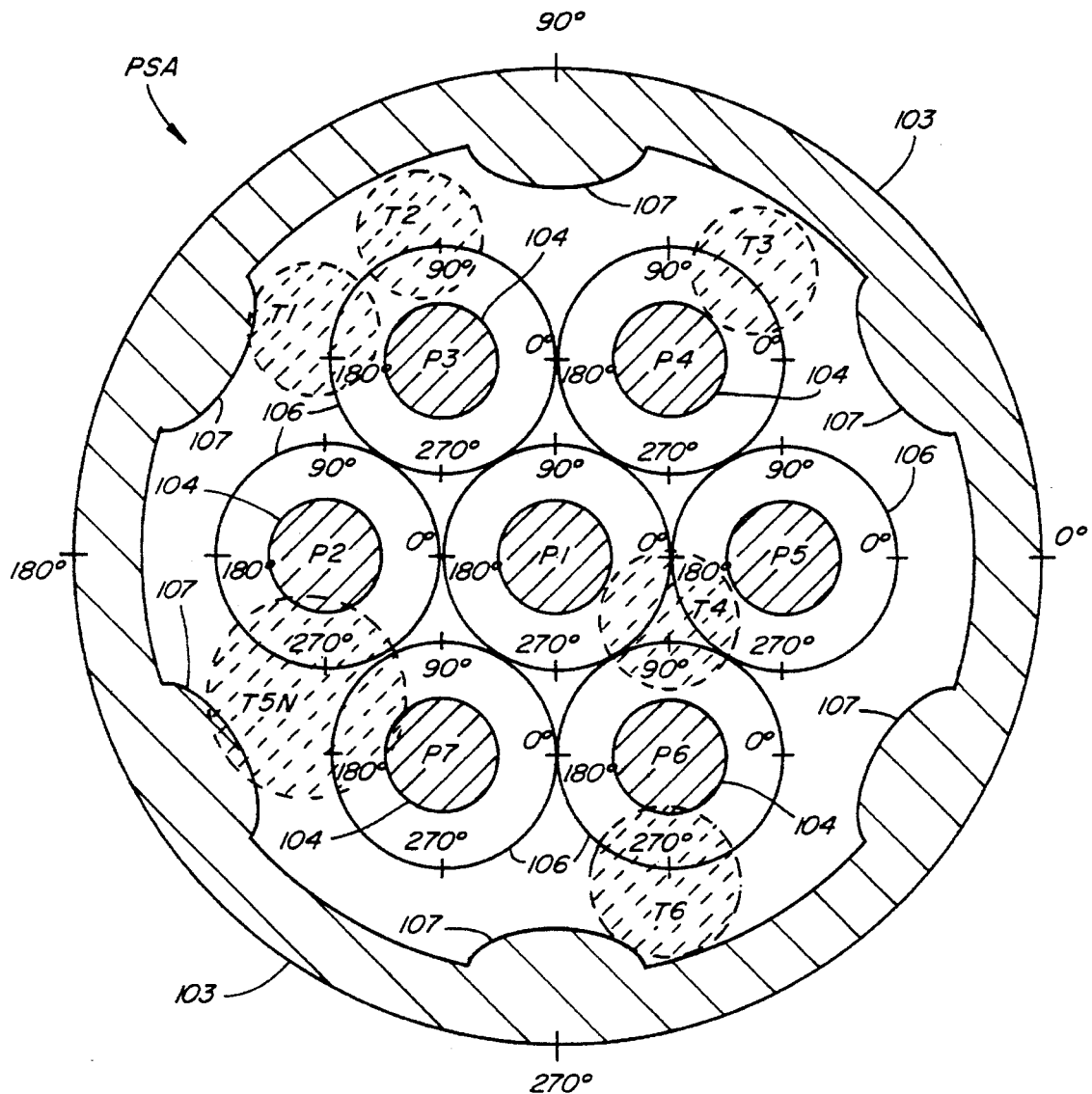
FIG. 15 is a radial view of the polar sensing array of FIG. 13 illustrating multiple target imaging.

In view of the fact that rotating magnetic fields as applied to inductive sensing, are limited in prior art, the inventor believes it proper to describe the fundamentals of 360 degree polar coordinate sensing. Referring now to FIG. 1, a hollow toroid core 25 formed of a ferromagnetic material, is shown in perspective and cross-sectional view, the inside excitation winding 101, having connecting leads labeled COSINE EXCITATION, and also having an outside excitation winding 100 wound around the outside of hollow toroid 25, having connecting leads labeled SINE EXCITATION. When sine-cosine excitation is applied to the inside and outside windings (sine excitation being applied to one winding, and cosine excitation being applied to the other winding) a rotating magnetic field is created throughout the entire core, originating at the domain level. The axis of each rotating magnetic domain being perpendicular to the surface of core 25 everywhere.

Refer now to FIG. 1 to determine the field rotational relationships at four points on a diametrical Z-axis line perpendicuarlly intersecting the hollow toroid wall at four points. The solid and dashed circular arrows CCWF and CWF indicate counter-clockwise and clockwise rotational directions.

FIG. 2 is a cross-section view of hollow toroid 25 showing the relative wall thickness; dimensions A, C, and D should be equal to provide a uniform flux path.

FIG. 4 is a perspective view of hollow toroid 25, the Z-axis intersects the side walls of core 25, the solid and dashed arrows indicate the relative field rotational directions, (the inside and outside excitation windings are not shown for clarity).

The dashed circles 103 indicate the hollow portion of toroid 25. With sine-cosine orthogonal to one another the magnetization vector is forced into rotation. If each plane of the core is inductively balanced, the rotation will be circular and not elliptical. Under the influence of sine-cosine induction there is a coextensive rotating magnetic field throughout the hollow toroid core, unlike any rotating magnetic field generated by conventional stator poles or cross coil arrangements.

In order to utilize this rotating magnetic field for eddy current sensing one more basic component is added to the hollow toroid, called a polar sensor (PS).

FIG. 5 is a perspective view of polar sensor 28 illustrating the structural detail. The central pole 32 is concentrically surrounded by the concentric outer pole 33, providing an annular coil space 34. Poles 32, and 33 are connected by means of a base portion 35 forming a pick-up core 35. Pick-up core 35 is formed of a ferromagnetic material, and is similar to half a conventional pot core. The signal coil 31 is wound around the central pole 32; normally the connecting leads would enter through a small hole in base portion.

FIG. 6 is a perspective view of polar sensor PS mounted in a bore in the outer circumference wall of the hollow toroid 25 (the hollow inside excitation winding space is not shown), with the Z-axis of the the pick-up core perpendicular to the surface of hollow toroid 25. The rotating field is coupled 360 degrees around the pick-up core. Notice the pick-up coil 31 is coplaner to the flux lines of the rotating magnetic field. With no target present no flux linking occurs, thus no signal is generated. The fringing flux above the sensing face has a hemispherical pattern, with the zenith (Z-axis) being coaxial to the pick-up core axis. In this application the polar circle (sensing face) of the pickup core is referenced in terms of azimuth degrees.

Referring now to FIG. 7, which is a side view of hollow toroid core 25, and an axial cross-section view of the mounted pick-up core 207 and pick-up coil 208. A ferrous target is coupling the fringing flux from the central pole 32, through the FERROUS TARGET and down through the concentric outer pole 33 and back to hollow toroid 25. Thus a portion of the rotating flux in hollow toroid 25 is being routed through the FERROUS TARGET, and linking coil 208, but notice the phase of this signal in reference to of the excitation windings of FIG. 1, depends on the azimuth location of the ferrous target over the concentric outer pole 33.

FIG. 8 is a perspective view of hollow toroid 25, showing the mounted pick-up core 207 having an annular pick-up coil space 35 (coil not shown). The circular arrow CCWF (counter-clockwise field) indicates the rotating field flux vector (the collective sum of the instantaneous domain polarity), the axis (zenith) of rotation is Z. The inside and outside excitation windings are not shown for clarity. FIG. 3 is a circular phase diagram illustrating the distributive axes (arrows) nature of the rotating magnetic generated in the hollow toroid driving core. In the instantaneous phase angle shown all the magnetic moments (arrows) are aligned toward the 0 degree polarization, illustrating the distributive axes nature of this rotating magnetic field.

Although the polar sensor just described provides a signal that fulfills most sensing applications there is another embodiment of the polar sensor which was disclosed in my parent patent U.S. Pat. No. 5,404,101 called a poly-phase polar sensor (PPS) which has at least two windings in a pick-up core having multiple concentric poles, providing poly-phase signals. FIG. 9 is a perspective view of a poly-phase polar sensor PPS (the poly-phase windings are not shown for clarity). The ferromagnetic core has an outer concentric pole 113, an intermediate concentric pole 114, and a central pole 115, thus providing two pick-up coil spaces 117, and 118. FIG. 10 is a radial view of poly-phase polar sensor PPS showing the two concentric pick-up coils 208P1 (phase one), and 208P2 (phase two).

FIG. 11 is an axial cross-sectional view of PPS showing how the concentric outer pole 113, and the concentric intermediate pole 114 surround the central pole 115, these three poles being molded to the base portion 116, the connecting leads are not being shown.

To shorten the magnetic circuit seen by phase 1 (coil 208P1) the depth of the annular coil groove P2G has been reduced, this modification also providing a tighter amplitude balance between phase 1 and phase 2. Again it must be remembered the rotating flux is coupling in a plane perpendicular to the axis of the poly-phase polar sensor (the co-axis of coils 208P1, and 208P2), this being illustrated by following the flux arrows in FIG. 10, coupling from the central pole 115, up through the ferrous target FT and back down through the intermediate pole 114, taking a shorter route through the thicker annular base portion 116A.

FIG. 12 is a radial view of the poly phase sensing face showing ferrous target FTC having a straight portion and a curved portion linking flux to both signal coils 208P1, and 208P2, but the curved portion of FTC causes a slight azimuth difference in azimuth flux coupling between phase 1, and phase 2. By careful analysis it wil be seen coil 208P1 has a center of flux coupling at 125 degrees azimuth, and 208P2 has a center of flux coupling at 127 degrees azimuth (these determinations are only approximate). The concentric geometry of the PPS sensor is transducing the curvature of the target FTC into two signals slightly differing in phase. Since signals derived by phase comparison have a superior signal to noise ratio, and are very accurate, this poly phase feature can be utilized to provide a more detailed eddy current image. State of the art zero-crossing detectors may be used to detect these very small phase differences between these poly phase signals, providing "coaxial resolution".

Both single phase and poly-phase polar sensors have the intrinsic characteristics of being:

(a) 360 degree directional indicating by phase shift.

(b) distance indicating by signal amplitude.

(c) signal nulled when no target present.

(d) signal nulled when flux is 360 degree balanced.

In this disclosure the 360 degree circular sensing range has been referred to as the azimuth heading when sensor directional reference is made. The sensing pattern is hemispherical.

FUNDAMENTALS OF POLAR SENSING ARRAYS

Although single-phase, and poly-phase polar sensors provide a much higher resolution eddy current image than conventional uniaxial eddy current probes, there is yet another polar sensor design that provides an even higher resolution eddy current image. Disclosed here is the first embodiment of a polar sensing array (PSA), which utilizes a pick-up core, having the same 360 degree rotating flux coupling as the previously disclosed polar sensor embodiments, with the additional features of a plurality of signal coils and poles arranged in a hexagonal sensing array pattern. FIG. 13 is a perspective view of a polar sensing array (PSA), having a single piece pick-up core 101 molded of ferromagnetic material, which has seven cylindrical pick-up poles 104, individually numbered 1–7 molded to the base portion 102, (FIGS. 13, 14, and 14A are greatly enlarged to show detail). Also shown in FIG. 14 (a cross-section view), are wound pick-up poles 1–7, forming a hexagonal pattern (to make a more compact unit).

A prerequisite of polar sensing array (PSA) design is a mutual 360 degree flux symmetry between all seven pick-up poles 1–7, in the sensing array pick-up core. As evident in FIG. 13, the hexagonal arrangement of pick-up poles 2–7, provides a 360 degree flux balance around pick-up pole 1, thus with no targets present each of the seven pick-up coils 106 will be seeing a balanced 360 degree flux pattern, and thus be signal nulled. The outer cylindrical magnetic pole 103 of FIGS. 13, and 14 is surrounding the seven pick-up poles 104 1–7 and spaced a predetermined distance from pick-up poles 2–7 to balance the rotating magnetic flux around all seven pick-up poles in such a way as to provide a signal null with no targets present. The half cylinder protrusions 107 molded to the inside circumference of the outer magnetic pole 103 are to provide a hexagonal flux pattern to pick-up poles 2–7. The flux balance spacing between pick-up poles 2–7 and the concentric outer pole 103 is found by experimentation, but once a 360 degree flux balance is found, these polar sensing array pick-up cores may be mass produced, at low cost. Since air gap reluctance in a magnetic circuit is well known, this 360 degree flux balancing procedure should present no unusual problems. FIG. 14 shows three of the pick-up poles 2, 1, 5, and the outer magnetic pole 103. FIG. 14A is a partial sensing face view, showing the three pick-up poles 2,1, 5 of FIG. 14; the point to be made here is, each individual pick-up pole has a 360 degree azimuth, as indicated by the 0, 90, 180, 270, degree azimuth reference points in FIG. 14A. Although the signal level of the individual pick-up coils 106 will not be as great as a single phase polar sensor of a given size, because the total flux area has been divided among seven pick-up coils, still there is adequate signal for most pre-amplifiers. FIG. 14 shows pick-up poles 2, 1, and 5 being wound with pick-up coils 106, having connecting leads 106A leading out through small holes in the base member 102. It should be noted in FIG. 14, the dimension A which is the thickness of the base member 102, should be of adequate thickness to provide a sufficient cross-section flux path to serve all seven pick-up poles. This seven pole polar sensor array embodiment is designed to interchange with the single, and polyphase polar sensors of my previous polar sensor inventions. This polar sensing array invention may also be utilized in the multiple polar sensor assembly concept i.e. a plurality of polar sensor arrays mounted in bores and driven by a single hollow toroid core. This interchangeability makes the invention very adaptable to many eddy current sensing applications, also reducing manufacturing costs. The preferred core material used in the molding of these pick-up cores is ferrite, utilizing well known pot core technology. FIG. 13 also shows a non-ferrous washer-like magnetic shield 105 surrounding the face portion of polar sensing array (PSA); shield 105 blocks any flux leakage from the hollow toroid core that might blur the eddy current image, and it also has a quasi-focusing effect on the sensing pattern, and thus a higher resolution eddy current image is provided. Magnetic shield 105 also serves as a Faraday shield, having a grounding lead 105A.

The primary purpose of the polar sensing array (PSA) of the present invention, is to provide transduction of multiple targets, or multiple surface irregularites which present flux asymmetrics across the sensing face of the PSA unit, thus finer detail being resolved into a plurality of phase-amplitude modulated signals, mutually related to the instantaneous direction of the rotating magnetic field. Each of the seven pick-up poles 1–7 is in essence a shaftless angular resolver, having a full 360 degree azimuth range, each providing a unique eddy current generator-detector in a very simple one coil transducer. By arranging seven polar sensors (PS) in a hexagonal sensing array pattern, a high resolution eddy current image transducer is provided.

Turning now to FIG. 15 to demonstrate multiple target transduction by means of the polar sensing array (PSA). FIG. 15 is an enlarged radial view of the polar sensing shown in FIGS. 13, 14, each pick-up pole 1–7 having a signal coil of many turns of 40 gauge or smaller insulated wire, and having connecting leads (not shown) leading out through small holes in the base portion.

Each pick-up pole is shown having azimuth reference degrees 0–90–180–270 in a counter-clockwise fashion about a Z-axis, as was shown in FIG. 13, having an inherent synchronism. Now, to illustrate some of the possible flux imbalance conditions presented by 6 targets located at various locations over PSA in FIG. 15: Ferrous target T1 has an azimuth heading of approximately 178 degrees to P3, coupling flux to protrusion 107. P3 also has a flux coupling of approximately 100 degrees azimuth heading to the outer circular magnetic pole 103, thus the vectorial sum of these two azimuth headings is a 139 degree phase angle signal generated in the pick-up coil 106 wound around P3. Although P3 cannot resolve two separate targets positions individually, still the output signal has a unique phase angle and amplitude resulting from the vectorial sum of the flux coupled by said two targets. Ferrous target T3 is shown coupling flux in the 45 degree azimuth of P4, thus a 45 degree signal will be generated in coil 106 of P4. Ferrous target T4 is shown coupling flux between pick-up poles P1, P5, and P6. Pick-up pole P1 is being coupled in approximately 350 degree azimuth toward P5, and P6, thus a 350 degree phase signal is transduced by P1. In like manner P5 is being flux coupled toward P1 and P6 in approximately 220 degree azimuth of P5, thus a 220 degree signal is generated in P5 coil. Pick-up poles P6 has a more complex flux coupling by ferrous targets T4, and T6. T4 is coupling flux in the 90 degree azimuth of P6, but T6 is coupling flux in the opposite direction over to the outer circular magnetic pole 103 and protrusion 107; thus if the amount of coupling is diametrically balanced, the signal from coil 106 of P6 will be nulled. All the targets shown in FIG. 15, T1–T6 are assumed to be lying in a plane coplaner to the sensing face of PSA, and thus all the same distance from the sensing face of PSA. The nonferrous target T5N is repelling flux in approximately 260 degree azimuth of P2, thus the coil of P2 will be generating an 80 degree azimuth signal. The nonferrous target T5N is also repelling flux in the 170 degree azimuth of P7, thus a 350 degree signal is being generated in the coil 106 of P7. From the above analysis it can be seen the polar sensing array (PSA) transduces the relative positions of a plurality of targets simultaneously. Also the targets may be combinations of both ferrous and non-ferrous metals. It is contemplated this feature may be utilized to detect impurity deposits on the surface of a parent metal.

The polar sensor has an inherent tilt sensitivity greater than 1. degree arc, which allows detection of surface irregularites inside the inspected metal (ferrous or nonferrous) tube. FIG. 16 is a radial view of the second embodiment of a polar sensing array (PSA), which has 19 polar sensor pick-up poles 1–19 arranged on a hexagonal pattern. Drawing FIG. 16 is greatly enlarged to show detail. As can be seen this embodiment has a much greater resolution than the polar sensing array embodiment of FIG. 13 due to the fact this embodiment has more pick-up poles. This 19 pick-up pole version would be used where a larger hollow toroid core is employed. This version is made according to all the guidelines given for the first embodiment of FIG. 13. This version has a cylindrical outer magnetic pole 103 having protrusions 107 for a more uniform flux spacing pattern between the pick-up poles P8–P19 and magnetic pole 103.

FIG. 16A is a cross-sectional side view of PSA showing pick-up poles P11, P3, P1, P6, and P17, each of which has a pick-up coil 106 wound around it, having connecting leads 106A leading out small holes in the base portion 102.

It will be apparent to those skilled in the art, that many changes, modifications, variations, and other uses and applications of the subject matter disclosed are possible and contemplated. All changes, modifications, variations, and other uses and applications which do not depart from the spirit and scope of the invention are deemed to be covered by the invention, which is limited only by the claims which follow.

I claim:

1. A polar coordinates sensing array having a plurality of pick-up elements driven by a rotating magnetic field generating means, for generating a plurality of polar coordinate signals representing the geometric shape of a metal target, said polar sensing array comprising:

a) a pick-up core formed of ferromagnetic material, further comprising:

i) an outer cylindrical pole closed at one end with a base portion forming a cup-like structure; and, ii) a plurality of cylindrical pick-up poles mounted inside the said cup-like structure with with the longitudinal axis of each cylindrical pick-up pole being arranged parallel to the longitudinal axis of the outer cylindrical pole in a hexagonal arrangement with the longitudinal axis of one cylindrical pick-up pole coaxial to the longitudinal axis of the outer cylindrical pole; and, one end of each cylindrical pick-up pole attached to the base portion inside the said cup-like structure; and, there being a predetermined spacing distance between adjacent cylindrical pick-up poles and the outer cylindrical pole so that each cylindrical pick-up pole has a 360 degree azimuth flux balance; and, the open end of the outer cylindrical pole and the cylindrical pick-up poles forming a sensing face; and, iii) a plurality of half cylinder protrusions attached to the inside circumference of the outer cylindrical pole, each protrusion symmetrically disposed between an adjacent pair of pick-up poles for improving flux distribution between the cylindrical pick-up poles and the outer cylindrical pole; and, iv) a pick-up coil wound around each of the said plurality of cylindrical pick-up poles for generating a plurality of polar coordinate signals simultaneously when the said 360 azimuth flux balance is upset.

2. The invention according to claim 1, wherein the said rotating magnetic field generating means comprises:

a) a hollow toroid core formed of ferromagnetic material, i) a first excitation winding wound within the hollow toroid core, for inducing a first magnetic field throughout the hollow toroid core;

ii) a second excitation winding wound around the outside of the hollow toroid core, for inducing a second magnetic field throughout the hollow toroid core;

iii) sine-cosine excitation being applied to the first and second excitation windings for inducing a rotating magnetic field throughout the hollow toroid core;

iv) the rotating magnetic field having distributive axes perpendicular to a line drawn tangent to the surface of the hollow toroid core everywhere;

v) a bore formed in the wall of the hollow toroid core, the axis of said bore being perpendicular to the surface of the hollow toroid core;

vi) the said polar coordinates sensing array being mounted partially within the said bore leaving an extending portion outside the surface of the hollow toroid; mounting of said array for coupling the rotating magnetic field within the hollow toroid to the outer cylindrical pole of the polar coordinates sensing array;

vii) the said sensing face extending outward of the hollow toroid surface.

3. The invention according to claim 1, wherein, the phase of the polar coordinate signal represents the target azimuth heading relative to the longitudinal axis of each individual pick-up pole; and, the polar coordinate signal amplitude represents the target distance from the axis of each individual pick-up pole, also:

the polar coordinate signal being nulled with no target present, provided by the said mutual flux balance.

4. The invention according to claim 2, wherein a non-ferrous washer-like magnetic shield is disposed concentrically around the extending portion of the polar sensing array for blocking flux leakage from the hollow toroid.

* * * * *